(12) United States Patent  (10) Patent No.: US 8,405,620 B2
Huang  (45) Date of Patent: Mar. 26, 2013

(54) TOUCH SENSITIVE DISPLAY HAVING DIFFERENT ADHESIVES AND METHOD FOR FABRICATING SAME

(75) Inventor: Ming-Li Huang, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 1089 days.

(21) Appl. No.: 12/152,106

(22) Filed: May 12, 2008

(65) Prior Publication Data

US 2008/0278456 A1  Nov. 13, 2008

(30) Foreign Application Priority Data

May 11, 2007 (CN) .......................... 2007 1 0074430

(51) Int. Cl.
G06F 3/041 (2006.01)

(52) U.S. Cl. ...... 345/173; 428/41.9; 428/40.1; 428/343; 428/344

(58) Field of Classification Search .................. 345/173
See application file for complete search history.

(56) References Cited

U.S. PATENT DOCUMENTS

| 6,285,421 | B1 * | 9/2001 | Lutnaes .......................... 349/72 |
| 6,538,706 | B2 | 3/2003 | Sun |
| 7,097,903 | B2 * | 8/2006 | Kishioka et al. ............. 428/354 |
| 7,141,768 | B2 * | 11/2006 | Malofsky et al. ............. 219/645 |
| 2005/0078094 | A1 | 4/2005 | Fujii et al. |
| 2006/0045989 | A1 * | 3/2006 | Minami ........................ 428/1.1 |

FOREIGN PATENT DOCUMENTS

| CN | 1219913 A | 6/1999 |
| CN | 1308736 A | 8/2001 |
| CN | 1606034 A | 4/2005 |
| TW | 200416265 A | 9/2004 |

* cited by examiner

*Primary Examiner* — Amare Mengistu
*Assistant Examiner* — Jennifer Zubajlo
(74) *Attorney, Agent, or Firm* — WPAT PC; Justin King

(57) ABSTRACT

An exemplary touch sensitive display (200) includes a display device (220) and a touch panel (210). The touch panel is attached on the display device through two adhesives (231, 232). The two adhesives have different adhesive capabilities.

18 Claims, 4 Drawing Sheets

TOUCH SENSITIVE DISPLAY HAVING DIFFERENT ADHESIVES AND METHOD FOR FABRICATING SAME

The present invention relates to touch sensitive displays, and particularly to a touch sensitive display having different adhesives and a method for fabricating the touch sensitive display.

BACKGROUND

Currently, various transparent touch panels such as resistance type touch panels, static-electricity-capacitance type touch panels and pressure-sensor type touch panels are widely used in different display device applications. Recently, displays combined with touch panels have become popular in business and entertainment. Generally, a touch sensitive display is achieved by attaching a transparent touch panel on the front of a display. The touch panel mounted on the display acts as an interface or a medium for inputting of signals by a user.

FIG. 11 shows a schematic, side cross-sectional view of a conventional touch sensitive display. The touch sensitive display 100 includes a display 102, a touch panel 101, and a peripheral adhesive 106. The touch panel 102 is attached on a periphery of a display surface (not labeled) of the display 102 by the adhesive 106.

FIGS. 12-14 are schematic, side cross-sectional views of sequential stages of fabricating the touch sensitive display 100.

In step 1, referring to FIG. 12, the display 102 and the touch panel 101 are provided. The display 102 can for example be a liquid crystal display (LCD). Referring also to FIG. 13, the adhesive 106 is provided too.

In step 2, referring to FIG. 13, the adhesive 106 with a predetermined thickness is applied on a peripheral area of the touch panel 101.

In step 3, referring to FIG. 14, the touch panel 101 is lowered down onto the display surface of the display 102, with the adhesive 106 facing the display surface. Then the peripheral area of the touch panel 101 is pressed, thereby firmly attaching the touch panel 101 on the display 102.

In the above-described method for fabricating the touch sensitive display 100, the touch panel 101 is directly attached on the display 102 through a single attaching process. However, during the attaching process, the touch panel 101 may not be accurately located in the correct predetermined position. When this happens, a touch sensitivity of the touch sensitive display 100 is liable to be reduced. Typically, it is necessary to separate the touch panel 101 from the display 102, and then reattach the touch panel 101 on the display 102. However, because the touch panel 101 is firmly adhered on the display 102, a separating action may damage or even completely destroy the touch panel 101. This reduces production efficiency and yield, and leads to a high cost of manufacturing the touch sensitive display 10.

Accordingly, what is needed is a touch sensitive display and a method for fabricating the touch sensitive display which can overcome the above-described deficiencies.

SUMMARY

In one embodiment, a touch sensitive display includes a display device and a touch panel. The touch panel is attached on the display device through at least two adhesives with different adhesive capabilities.

In another embodiment, a touch sensitive display device includes a touch sensitive plate, a display device, and at least two adhesives with different adhesive capabilities. The at least two adhesives bond the touch sensitive plate and the display device together.

In still another embodiment, a method for fabricating a touch sensitive display includes the following steps. A display, a touch panel, and at least two adhesives with different adhesive capabilities are provided. The at least two adhesives are applied on the touch panel or the display. The touch panel is moved onto the display, with at least one of the at least two adhesives preliminarily adhering the touch panel and the display together. Whether the preliminarily adhered touch panel and display satisfy one or more predetermined specifications for the touch sensitive display is determined. The touch panel is firmly and the display are firmly adhered together by all of the at least two adhesives.

Other novel features and advantages will become more apparent from the following detailed description when taken in conjunction with the accompanying drawings.

DETAILED DESCRIPTION OF PREFERRED EMBODIMENTS

Figure 1:
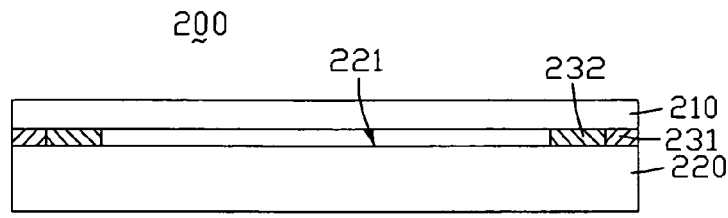
FIG. 1 is a schematic, side cross-sectional view of a touch sensitive display according to first embodiment of the present invention.

FIG. 1 is a side cross-sectional view of a touch sensitive display according to a first embodiment of the present invention. The touch sensitive display 200 includes a display 220, a touch panel 210, a first adhesive 231, and a second adhesive 232.

Figure 3:
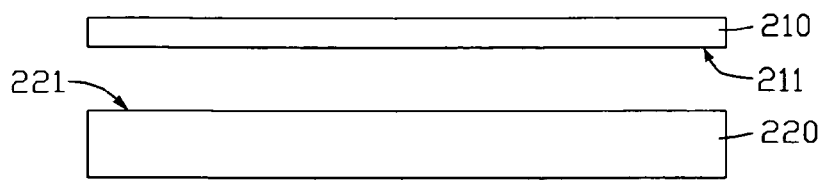
FIGS. 3 to 6 are schematic, side cross-sectional views of sequential stages in the method for fabricating a touch sensitive display of FIG. 2, using the touch sensitive display of FIG. 1 as an example.

The display 220 is a flat panel display that includes a display surface 221 for displaying images. The touch panel 210 is plate shaped, and is arranged on the display surface 221. Referring also to FIG. 3, the touch panel 210 defines a bonding area 211 at an inner peripheral surface thereof. The display 220 defines a bonding area (not labeled) at a periphery of the display surface 221. The bonding area 211 of the touch panel 210 corresponds to the bonding area of the display 220. The first and second adhesives 231, 232 are arranged side by side at the bonding areas, and firmly adhere the touch panel 210 on the display surface 221 of the display 220. The first adhesive 231 is arranged at an outer portion of the bonding areas. The second adhesive 232 is arranged at an inner portion of the bonding areas. The second adhesive 232 has a stronger adhesive capability than that of the first adhesive 231.

The display 220 can for example be selected from the group consisting of a liquid crystal display (LCD), a cathode ray tube (CRT) display, a flat intelligent tube (FIT) display, a light emitting diode (LED) display, a plasma display panel (PDP), an organic light emitting display (OLED), a field emission display (FED), and the like.

The touch panel 210 can for example be selected from the group consisting of a resistance type touch panel, a static-electricity-capacitance type touch panel, a pressure-sensor type touch panel, an infrared ray type touch panel, and the like.

The first and second adhesives 231, 232 can for example be selected from the group consisting of hot-melt adhesives, light-curable adhesives (e.g., ultraviolet ray-curable adhesives), and the like.

Figure 2:
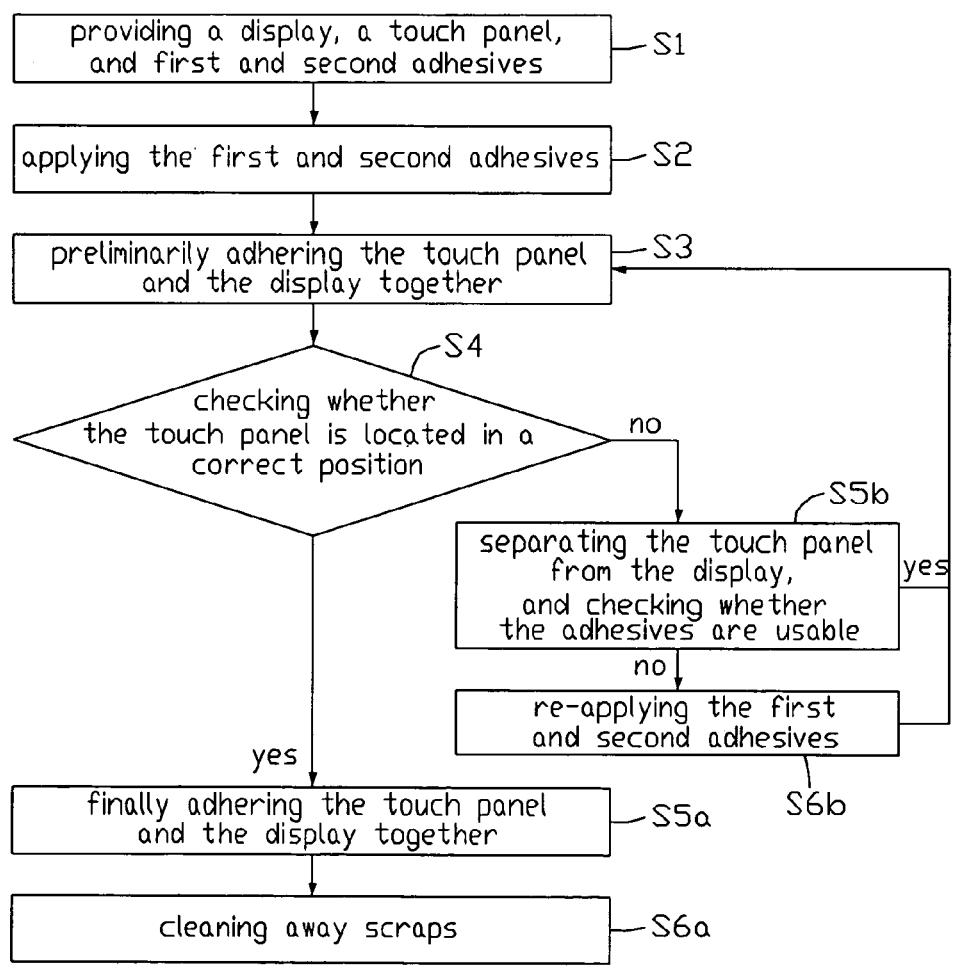
FIG. 2 is a flowchart summarizing a first exemplary method for fabricating a touch sensitive display according to the present invention.

FIG. 2 is a flowchart summarizing a first exemplary method for fabricating a touch sensitive display according to the present invention. The method includes: step s1, providing a display, a touch panel, a first adhesive, and a second adhesive; step s2, applying each of the first and second adhesives on a selected one of the touch panel and the display; step 3, preliminarily adhering the touch panel and the display together; step 4, checking whether the touch panel is located in a predetermined correct position; step 5a, finally adhering the touch panel and the display together; step 6a, cleaning away scraps; step 5b separating the touch panel from the display, and checking whether the first and second adhesives are usable; and step 6b, re-applying the first and second adhesives. In the following description, the first exemplary method is applied in respect of the touch sensitive display 200. The following description is but one of numerous different ways of carrying out the first exemplary method.

Figure 4:
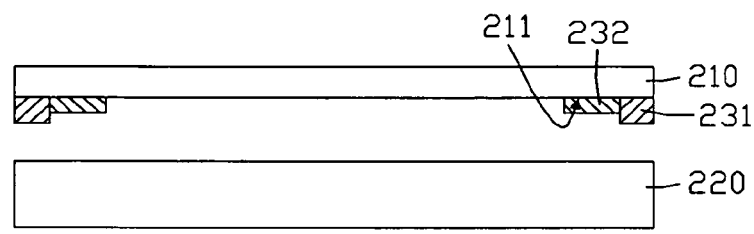

In step S1, referring to FIG. 3, a touch panel 210 and a display 220 are provided. Referring also to FIG. 4, a first adhesive 231 and a second adhesive 232 are provided too. The touch panel 210 has a bonding area 211 at an inner peripheral surface thereof. The display 220 has a display surface 221 for displaying images.

In step S2, referring to FIG. 4, the first and second adhesives 231, 232 are applied side by side at the bonding area 211 of the touch panel 210. The first adhesive 231 is applied at an outer portion of the bonding area 211. The second adhesive 232 is applied at an inner portion of the bonding area 211. The first adhesive 231 is thicker than the second adhesive 232. A thickness ratio of the first adhesive 231 to the second adhesive 232 can be in a range of 1.2:1 to 4.0:1. A typical thickness ratio is in a range of 1.5:1 to 3.0:1.

Figure 5:
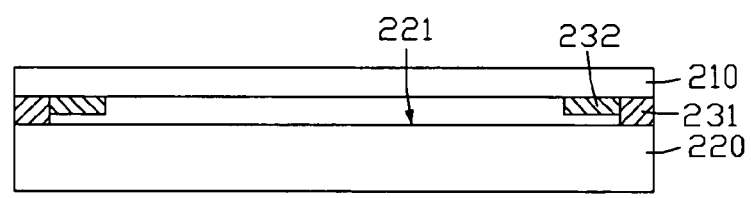

In step S3, referring to FIG. 5, the touch panel 210 is lowered down onto the display surface 221 of the display 220, with the first and second adhesives 231, 232 facing the display surface 221. Then the touch panel 210 is lightly pressed and thus preliminarily adhered on the display surface 221. That is, the first adhesive 231 contacts both the touch panel 210 and the display surface 221 of the display 220, and the second adhesive 232 only contacts the touch panel 210 and maintains a distance spaced from the display surface 221 of the display 220.

In step S4, position marks (not shown) of the touch panel 210 and the display 220 are checked, in order to confirm whether the touch panel 210 is located in a predetermined correct position.

Figure 6:
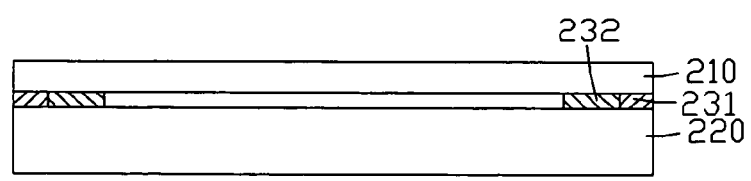

If the touch panel 210 is located in the correct position in step S4, the method proceeds to step S5a, as follows. Referring to FIG. 6, the touch panel 210 is further pressed until the first adhesive 231 becomes thinner than before, and the second adhesive 232 contacts the display surface 221. Due to a strong adhesive capability of the second adhesive 232, the touch panel 210 is firmly adhered on the display 220 by the first and second adhesives 231, 232.

In step 6a, scraps, such as portions of the first and second adhesives 231, 232, are removed after step 5a. Finally, a touch sensitive display 200 is achieved.

If the touch panel 210 is not located in the correct position in step S4, the method proceeds to step S5b, as follows. The touch panel 210 is separated from the display 220. Because only the first adhesive 231 contacts both the touch panel 210 and the display 220, it is relatively easy to separate the touch panel 210 from the display 220. This helps ensure that the touch panel 210 is not damaged and is still usable.

Also in step S5b, it is determined whether the first and second adhesives 231, 232 on the touch panel 210 are still usable. If the determination is "yes", the method proceeds to step S3 and subsequent steps until the touch sensitive display 200 is achieved.

If the determination is that either or both of the first and second adhesives 231, 232 on the touch panel 210 are not usable, the method proceeds to step S6b. In step S6b, the first and second adhesives 231, 232 are removed, and new first and second adhesives 231, 232 are reapplied on the bonding area 211 of the touch panel 210. Then the method proceeds to step S3 and subsequent steps until the touch sensitive display 200 is achieved.

In the above-described touch sensitive display 200, the first and second adhesives 231, 232 with different adhesive capabilities are used to attach the touch panel 210 on the display 220. The first and second adhesives 231, 232 provide strong adhesive capability between the touch panel 210 and the display 220. Accordingly, the touch sensitive display 200 has higher reliability and durability.

In summary, in the method for fabricating the touch sensitive display 200, the step preliminary adhering is performed first. Then the position of the touch panel 210 is checked. During the checking step, production defects, such as incorrect location, can be found. In such case, the touch panel 210 can be easily separated from the display 220, and subsequently reattached on the display 220. The final adhering step is performed only when the touch panel 210 is located in the correct position and there are no other production defects. Accordingly, this method can improve production efficiency and yield, and reduce the cost of manufacturing the touch sensitive display 200.

Figure 7:
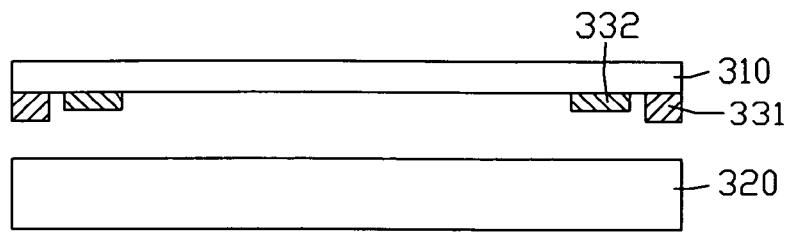
FIGS. 7 to 8 are schematic, side cross-sectional views of sequential stages of a second exemplary method for fabricating a touch sensitive display according to the present invention.
Figure 8:
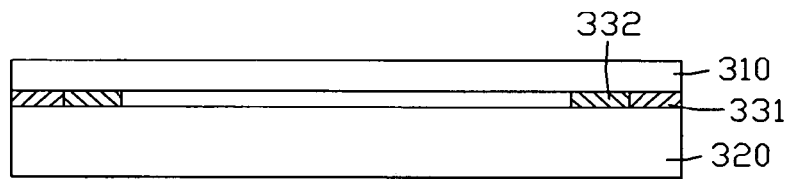

FIGS. 7 and 8 show sequential stages of a second exemplary method for fabricating a touch sensitive display according to the present invention. The second exemplary method is similar to the above-described first exemplary method. However, in a step of applying a first adhesive 331 and a second adhesive 332, the first and second adhesives 331, 332 are applied at a peripheral bonding area (not labeled) of a touch panel 310 side by side. An interval is defined between the first and second adhesives 331, 332 (as seen in FIG. 7). The interval is as wide as 20%-80% of a corresponding width of the first adhesive 331. Then in a final adhering step, the first adhesive 331 is pressed to be thinner and wider. The first adhesive 331 thereby occupies the interval and contacts the second adhesive 332 (as seen in FIG. 8). The first and second adhesives 331, 332 cooperatively attach the touch panel 310 on the display 320. The second exemplary method avoids mixing of the first and the second adhesive 331, 332, which helps ensure that the adhesive capabilities of the first and second adhesives 331, 332 are fully maintained.

Figure 9:
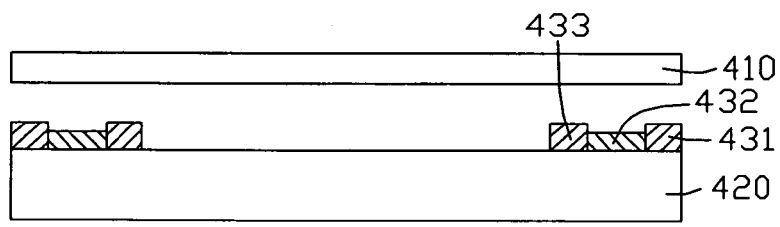
FIG. 9 is a schematic, side cross-sectional view of one stage of a third exemplary method for fabricating a touch sensitive display according to the present invention.

In alternative embodiments, more than two adhesives can be used. For example, FIG. 9 shows one stage of a third exemplary method for fabricating a touch sensitive display according to the present invention. The third exemplary method is similar to the above-described first exemplary method. However, in the third exemplary method, adhesives 431, 432, 433 are used for attaching a touch panel 410 on a display 420. The adhesives 431, 432, 433 can be applied in turn on a peripheral area of the display 420, without intervals between each two adjacent adhesives 431, 432, 433. Then a preliminary adhering step and a final adhering step are sequentially performed to achieve a touch sensitive display 4.

Figure 10:
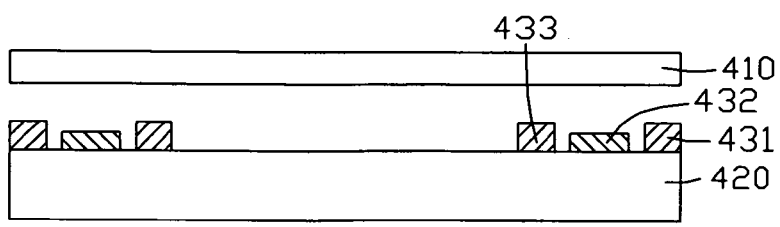
FIG. 10 is a schematic, side cross-sectional views of one stage of a fourth exemplary method for fabricating a touch sensitive display according to the present invention.
Figure 11:
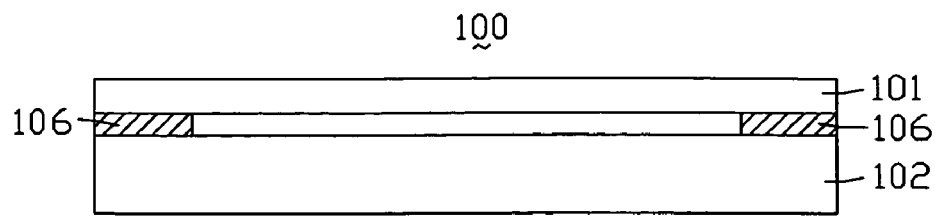
FIG. 11 is a schematic, side cross-sectional view of a conventional touch sensitive display.
Figure 12:
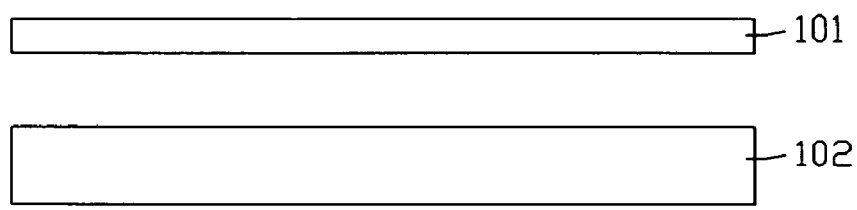
FIGS. 12 to 14 are schematic, side cross-sectional views of sequential stages of a conventional method for fabricating the touch sensitive display of FIG. 11.
Figure 13:
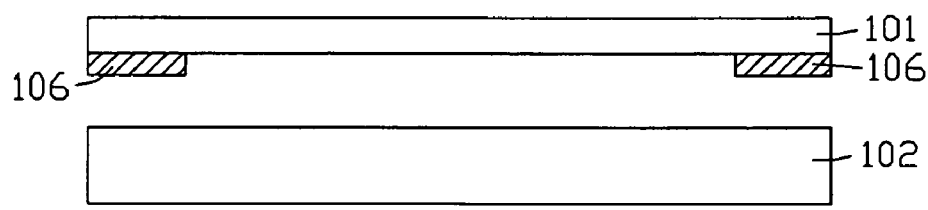
Figure 14:
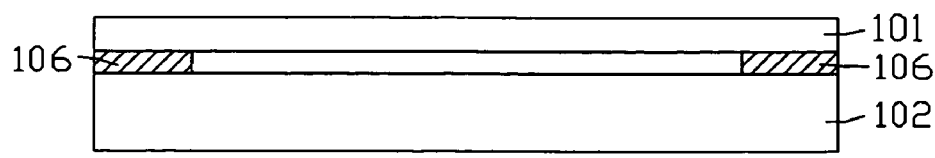

In another example, FIG. 10 shows one stage of a fourth exemplary method for fabricating a touch sensitive display according to the present invention. The fourth exemplary method is similar to the above-described third exemplary method. However, in the fourth exemplary method, the adhesives 431, 432, 433 are applied in turn at the peripheral area of the display 420, with intervals between each two adjacent adhesives 431, 432, 433.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A touch sensitive display, comprising:
    a display device; and
    a touch panel attached on the display device through at least two adhesives mounted directly to either the touch panel or the display device, wherein all of the at least two adhesives are mounted on the same surface;
    wherein the at least two adhesives have different adhesive capabilities, one of the at least two adhesives having a stronger adhesive capability than another one of the at least two adhesives.

2. The touch sensitive display of claim 1, wherein the at least two adhesives are arranged at a periphery of the touch sensitive display between the touch panel and the display device.

3. The touch sensitive display of claim 1, wherein the at least two adhesives are arranged side by side, between a peripheral area of the touch panel and a peripheral area of the display device, with the one of the at least two adhesives being nearer an outside of the touch sensitive display than the other one of the at least two adhesives.

4. The touch sensitive display of claim 1, wherein the at least two adhesives comprise three adhesives, being a first adhesive, a second adhesive, and a third adhesive arranged side by side at a periphery of the touch sensitive display between the touch panel and the display device.

5. The touch sensitive display of claim 1, wherein the display device is any item selected from the group consisting of a liquid crystal display, cathode ray tube display, flat intelligent tube display, light emitting diode display, plasma display panel, organic light emitting display, and field emission display.

6. The touch sensitive display of claim 1, wherein the touch panel is any item selected from the group consisting of a resistance type touch panel, static-electricity-capacitance type touch panel, pressure-sensor type touch panel, and infrared ray type touch panel.

7. The touch sensitive display of claim 1, wherein the at least two adhesives are selected from the group consisting of a hot-melt adhesive and a light-curable adhesive.

8. The method of claim 1, wherein the one of the at least two adhesives having the weaker adhesive capability is thicker than the other one of the at least two adhesives having the stronger adhesive capability.

9. The method of claim 8, wherein an interval is defined between the one of the at least two adhesives and the other one of the at least two adhesives.

10. A touch sensitive display device, comprising:
    a touch sensitive plate;
    a display device; and
    at least two adhesives with different adhesive capabilities mounted directly to either the touch sensitive plate or the display device, wherein all of the at least two adhesives are mounted on the same surface, one of the at least two adhesives having a stronger adhesive capability than another one of the at least two adhesives, the at least two adhesives bonding the touch sensitive plate and the display device together.

11. A method for fabricating a touch sensitive display, the method comprising:
    providing a display, a touch panel, and at least two adhesives with different adhesive capabilities, a second one of the at least two adhesives having a stronger adhesive capability than a first one of the at least two adhesives;
    applying the at least two adhesives directly on either the touch panel or on the display, wherein all adhesives are applied on the same surface;
    moving the touch panel onto the display, with at least one of the at least two adhesives preliminarily adhering the touch panel and the display together;
    determining whether the preliminarily adhered touch panel and display satisfy one or more predetermined specifications for the touch sensitive display; and
    firmly adhering the touch panel and the display together by all of the at least two adhesives.

12. The method of claim 11, wherein the first and second adhesives are applied side by side on a peripheral area of the touch panel or the display.

13. The method of claim 11, wherein after the first and second adhesives are applied on the touch panel or the display and before the touch panel and the display together are adhered together, the first adhesive having the weaker adhesive capability is thicker than the second adhesive having the stronger adhesive capability.

14. The method of claim 13, wherein a thickness ratio of the first adhesive to the second adhesive is in a range of 1.2:1 to 4.0:1.

15. The method of claim 13, wherein an interval is defined between the first adhesive and the second adhesive.

16. The method of claim 15, wherein a width of the interval is in the range of 20%-80% of a corresponding width of the first adhesive.

17. The method of claim 11, wherein the one or more predetermined specifications comprise the touch panel being in correct position relative to the display.

18. The method of claim 11, wherein the at least one of the at least two adhesives which preliminarily adheres the touch panel and the display together is the first adhesive that has the weaker adhesive capability than the second adhesive.

* * * * *